US005478207A

United States Patent [19]
Stec

[11] Patent Number: 5,478,207
[45] Date of Patent: Dec. 26, 1995

[54] STABLE BLADE VIBRATION DAMPER FOR GAS TURBINE ENGINE

[75] Inventor: Philip F. Stec, Medford, Mass.

[73] Assignee: General Electric Company, Cincinnati, Ohio

[21] Appl. No.: 308,181

[22] Filed: Sep. 19, 1994

[51] Int. Cl.⁶ .................................................. F01D 5/26
[52] U.S. Cl. ...................................... 416/219 R; 416/500
[58] Field of Search ................................... 416/144, 145, 416/193 A, 219 R, 220 R, 248, 500

[56] References Cited

U.S. PATENT DOCUMENTS

| | | |
|---|---|---|
| Re. 32,339 | 1/1987 | Jones et al. . |
| 3,037,741 | 6/1962 | Tuft . |
| 3,666,376 | 5/1972 | Damlis ............................ 416/219 R |
| 3,689,177 | 9/1972 | Klassen ........................... 416/220 R |
| 3,751,183 | 8/1973 | Nichols et al. ..................... 416/500 |
| 4,182,598 | 1/1980 | Nelson . |
| 4,455,122 | 6/1984 | Schwarzmann et al. . |
| 4,568,247 | 2/1986 | Jones et al. . |
| 4,872,812 | 10/1989 | Hendley et al. ..................... 416/500 |
| 5,052,890 | 10/1991 | Roberts . |
| 5,156,528 | 10/1992 | Bobo . |
| 5,205,713 | 4/1993 | Szpunar et al. ..................... 416/500 |
| 5,215,442 | 6/1993 | Steckle et al. . |
| 5,226,784 | 7/1993 | Mueller et al. . |
| 5,261,790 | 11/1993 | Dietz et al. . |
| 5,302,085 | 4/1994 | Dietz et al. . |

Primary Examiner—Edward K. Look
Assistant Examiner—Christopher Verdier
Attorney, Agent, or Firm—Andrew C. Hess; Patrick R. Scanlon

[57] ABSTRACT

An improved, highly stable blade-to-blade vibration damper configuration which provides substantially continuous blade vibration damping and sealing of an interplatform gap due to positional stability thereof. Disposed in a subplatform cavity, the damper is comprised of a generally triangular shaped body having a vertex thereof aligned with the interplatform gap. A primary damper load face abuts a first inclined platform load face and a secondary damper load face abuts a second inclined platform load face. Maintenance of sliding planar contact between primary and first load faces and sliding linear contact between secondary and second load faces is afforded by orienting inclined platform faces to have an included angle greater than that of the damper vertex and offsetting a damper center of gravity toward the primary load face. The damper may include one or more legs to orient the damper in the cavity and one or more extending tabs to discourage hot gas flow thereby. In a preferred embodiment, the damper is utilized as an as-cast member, without the need for additional processing or machining, and the vertex included angle is greater than about 90 degrees.

18 Claims, 3 Drawing Sheets

STABLE BLADE VIBRATION DAMPER FOR GAS TURBINE ENGINE

The U.S. Government has rights to this invention pursuant to Contract No. N00019-91-C-0114.

TECHNICAL FIELD

The present invention relates generally to a rotor configuration for a gas turbine engine and more specifically to an improved configuration blade-to-blade damper exhibiting enhanced stability, vibration damping and interplatform sealing.

BACKGROUND INFORMATION

Gas turbine engine rotors are typically configured with removable blading in fan, compressor and turbine stages to facilitate cost effective replacement of damaged or worn out components. For example, fan and compressor blading may be damaged by foreign objects such as pebbles, birds and ice which may be ingested into the engine. Alternatively, turbine blading is conventionally life limited, requiring replacement after a predetermined number of flight hours or engine cycles, due to the harsh, high temperature corrosive environment in which the blading operates.

According to one attachment scheme, a plurality of blades have contoured dovetails disposed in a common number of complementarily shaped dovetail slots formed in a rim portion of a disk. During engine operation, the cantilevered blading is subject to complex, multi-order modes of vibration due to interaction of the airfoils thereof with primary engine airflow. Depending on the mode and amplitude of vibration, high cycle fatigue cracks may be initiated and propagated in high stress regions of the blade, for example in the airfoil, dovetail or shank.

In order to limit the detrimental effects of such vibration, especially at blade resonant frequencies which fall within the operating range of the engine, damping schemes are routinely employed which convert the vibratory energy, using the motion associated therewith, into dissipated heat. There exist two basic damping schemes: blade-to-ground damping and blade-to-blade damping. One such blade-to-ground damper apparatus is disclosed in U.S. Pat. No. 5,226,784 entitled "Blade Damper" granted to Mueller et al on Jul. 13, 1993 and assigned to the same assignee as the present invention. According to Mueller et al, a damper of triangular cross section disposed in a chamber in a disk post contacts a radial face of the chamber along one leg and a blade platform along an hypotenuse thereof. Vibratory induced motion of the blade platform produces advantageous slippage at the abutting surfaces.

Blade-to-blade damper apparatus are disclosed in U.S. Pat. No. 5,156,528 entitled "Vibration Damping of Gas Turbine Engine Buckets" granted to Bobo on Oct. 20 1992 and U.S. Pat. No. 5,302,085 entitled "Turbine Blade Damper" granted to Dietz et al on Apr. 12, 1994, both of which are also assigned to the same assignee as the preset invention. While relying on the same friction mechanism for damping as the aforementioned blade-to-ground damper, blade-to-blade dampers are fundamentally different in that these dampers are disposed between portions of adjacent blades, for example, proximate blade platform edges. Depending on the mode and amplitude of vibratory induced motion sought to be attenuated, one damping scheme may be more beneficial than the other. For example, while blade-to-blade dampers are relatively ineffective at damping in-phase motion of adjacent blades, such dampers may be highly effective when blade motion is out of phase, as discussed by Mueller et al.

Blade-to-blade dampers may also be advantageously employed to seal the gap formed between adjacent platform edges to prevent the migration of hot flowpath gases into the rim region of the disk, especially in a turbine stage. Effective damping and sealing however necessitate a stable damper configuration. The centrifugally loaded damper and mating platform surfaces must cooperate, providing sliding contact therebetween. If the radial damper load is too high or the included angle too acute, the damper may lock to one or both mating platform surfaces. In this case, while acting as an effective seal, the damper provides little or no damping as relative movement is prevented.

An effective damper apparatus should provide substantially continuous sliding contact between the damper and associated blade structures for all operating conditions and tolerance stacks. Ensuring such a condition has been problematic. Due to the inherent variability associated with both the orientation and movement of abutting surfaces, maintenance of sliding contact between the damper and both blades simultaneously is troublesome. Conventional triangular shaped dampers often exhibit bistable rocking, sustaining planar contact first with one blade platform then the other, depending on the movement of the platforms. Contributing to this instability are a variety of factors such as initial damper orientation and vertex angle, mating platform surface location and orientation as well as component tolerances associated therewith. Damper instability results in both intermittent damping and ineffective sealing.

SUMMARY OF THE INVENTION

An improved, highly stable blade-to-blade damper having a triangular cross section comprises a primary planar load face oriented to abut a portion of a first blade and a secondary planar load face oriented to abut a portion of an adjacent blade. A vertex formed between primary and secondary load faces is disposed in the gap formed between adjacent blade platforms and has an included angle of greater than about 90 degrees. Inclination of the primary load face causes sliding of the damper therealong under centrifugal loading until contact occurs between the secondary load face and the adjacent blade platform. By advantageously distributing the mass of the damper in a predetermined manner so as to offset the damper center of gravity toward the primary load face, substantially planar contact between the primary load face and abutting blade platform and substantially linear contact between the secondary load face and adjacent blade platform are maintained. Relative movement occurring between blade platforms during engine operation operates to slide the damper along the primary load face without rocking, thereby providing both effective damping and effective interplatform sealing.

In a preferred embodiment, the damper has a vertex included angle of between about 90 degrees and 120 degrees, the nominal included angle formed by the adjacent blade platforms being slightly larger. The damper includes additional features for initially positioning the damper with respect to the platforms and for restricting flow through a subplatform cavity in which the damper is disposed. Since damping is primarily afforded by sliding contact along the primary load face, damper effectiveness is substantially insensitive to vertex included angle. The damper may therefore be advantageously manufactured as a low cost casting and utilized in the as-cast state, without the need for subsequent costly processing such as grinding or machining.

BRIEF DESCRIPTION OF DRAWINGS

The novel features believed characteristic of the invention are set forth and differentiated in the appended claims. The invention, in accordance with preferred and exemplary embodiments, together with further advantages thereof, is more particularly described in the following detailed description taken in conjunction with the accompanying drawings in which:

DETAILED DESCRIPTION OF THE INVENTION

Figure 1:
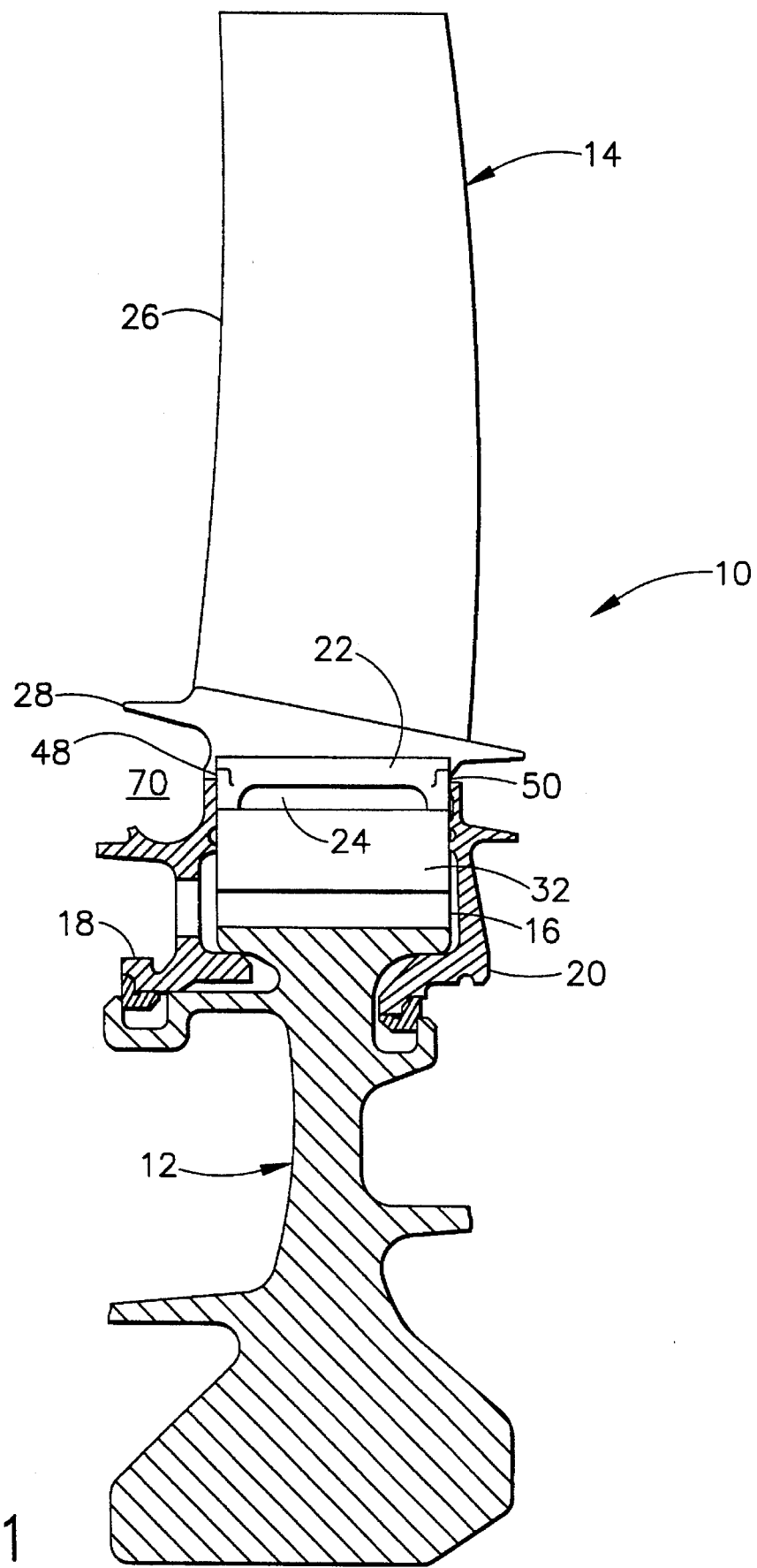
FIG. 1 is a schematic, sectional view of a bladed disk in accordance with a preferred embodiment of the present invention.

FIG. 1 is a schematic, sectional view of a turbine rotor state 10 of a gas turbine engine in accordance with a preferred embodiment of the present invention. While a turbine is being used as an example to facilitate disclosure of the inventive concept of the instant invention, it should be recognized that the teaching herein is applicable to any rotating blade subject to vibratory excitation, including fan and compressor blading. Turbine stage 10 is comprised of a rotatable disk 12 having a plurality of turbine blades 14 disposed in a rim portion 16 thereof. Forward and aft blade retainers 18, 20 prevent axial disengagement of the blades 14 from the disk 12. Further, retainers 18, 20 prevent migration of each blade-to-blade damper 22 from each respective subplatform damper cavity 24, shown best in FIG. 2.

Each blade 14 is comprised of a radially extending airfoil 26, axially and circumferentially extending platform 28, blade shank or neck 30, and contoured dovetail 32. Each dovetail 32 is disposed in a complementarily contoured dovetail slot 34 formed between adjacent disk posts 36. Respective contours of dovetails 32 and slots 34 are carefully defined and manufactured to ensure proper load transmission between the blades 14 and disk 12 as is conventionally known. Each damper cavity 24 is therefore bounded, in part, by adjacent blade platforms 28 and shanks 30, disk post 36 and retainers 18, 20, as shown in FIGS. 1 and 2.

Figure 3:
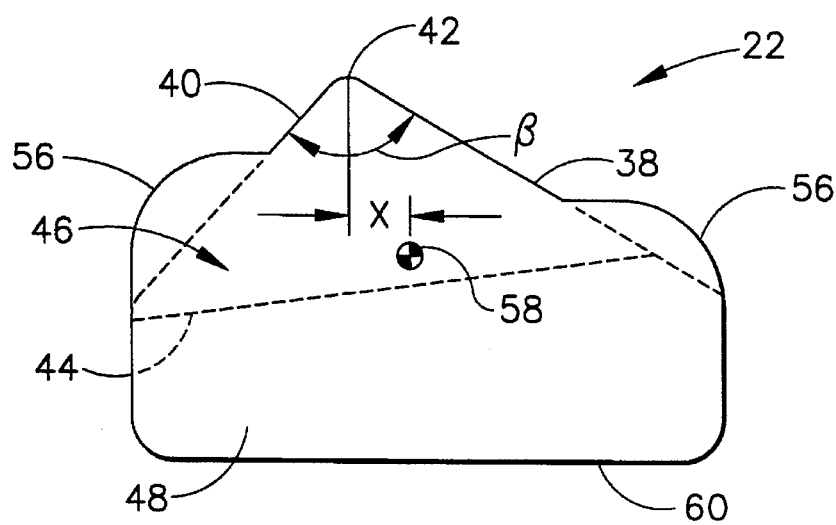
FIG. 3 is an enlarged schematic end view of the damper of FIG. 2.
Figure 4:
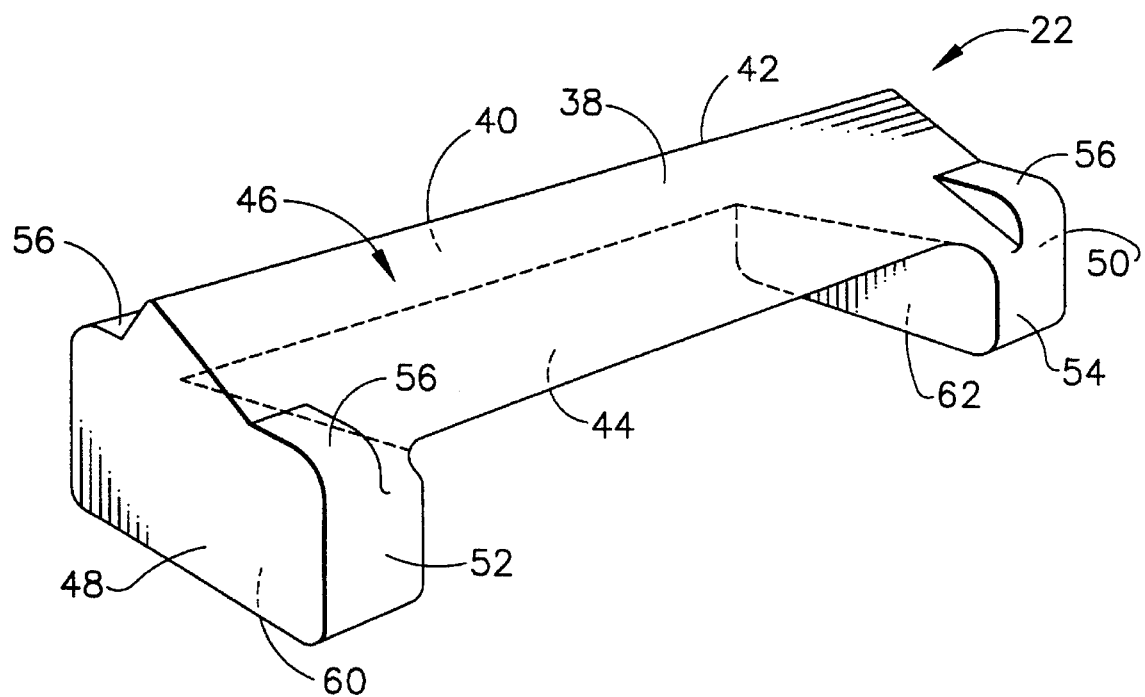
FIG. 4 is a schematic, perspective view of the damper of FIG. 2.

Looking now additionally to FIGS. 3 and 4, damper 22 is comprised of a primary planar load face 38 and a secondary planar load face 40 which intersect to form vertex 42 having an included angle $\beta$. A base 44 intersects both primary and secondary load faces 38, 40 to form a generally triangular shaped damper body 46. Damper 22 further comprises legs 52, 54 which extend from body 46 at respective proximal and distal ends 48, 50, and which facilitate proper orientation of damper 22 in subplatform cavity 24, as will be discussed in more detail below. Additionally, a plurality of tabs 56 extend from body 46 along load faces 38, 40 at ends 48, 50 to discourage undesirable flow through cavity 24, as also discussed below.

Referring to the configuration of triangular body 46 in FIG. 3, the location and orientation of base 44 with respect to load faces 38, 40 is predetermined to produce a damper 22 having a desired weight and mass distribution. For the particular configuration depicted, damper 22 has a center of gravity 58 which is offset from vertex 42 in a transverse direction toward primary load face 38 a distance x, shown exaggerated in the depiction in FIG. 3. In the installed condition shown in FIG. 2, the distance x is substantially the distance from the center of gravity 58 to a radial line R passing through the vertex 42. The magnitude of offset x is substantially controlled by the angular orientation of base 44 with respect to a plane defined by leg lower faces 60, 62. The overall weight of the damper is substantially controlled by the location of the base 44 relative to the leg face plane. By varying the location and orientation of the base 44, the weight of the damper 22 and distribution of loading between load faces 38, 40 can be tailored to meet the requirements of a specific application.

Figure 2:
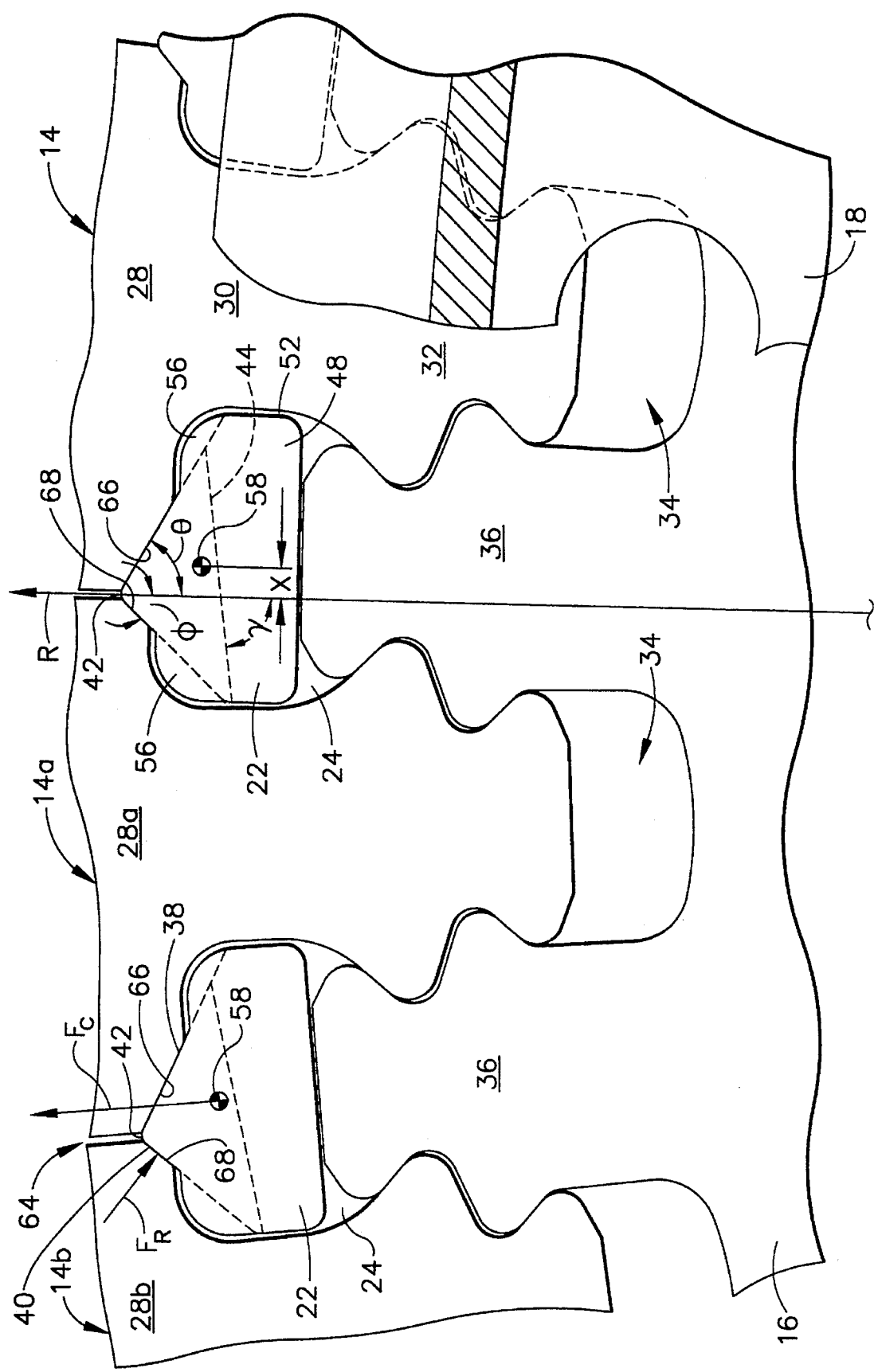
FIG. 2 is a schematic, axial view of a portion of a bladed disk showing damper orientation and placement.

Shown in an installed state in FIG. 2, damper 22 is disposed in subplatform cavity 24 with vertex 42 generally aligned with an interplatform gap 64 disposed between proximate platforms 28a, 28b of respective adjacent blades 14a, 14b. As disk 12 rotates, damper 22 is urged radially outwardly, or upwardly, as shown in FIG. 2, by centrifugal force $F_c$ acting through center of gravity 58 until primary load face 38 abuts a first inclined planar load face 66 of platform 28a. Due to the inclination of load face 66, damper 22 then slides along load face 66 under the continuing influence of centrifugal force $F_c$ until secondary load face 40 abuts a second inclined planar load face 68 of platform 28b.

As platforms 28a, 28b move relative to one another during engine operation in radial, axial and circumferential directions, substantially sliding planar contact is maintained between faces 38, 66, whereas substantially linear contact is maintained between faces 40, 68. Maintenance of this stable contact relationship is afforded by offsetting the center of gravity 58 toward primary load face 38, as previously described, in combination with orienting platform inclined faces 66, 68 in a preferred manner. As stated hereinbefore, damper vertex 42 has an included angle $\beta$. A predetermined nominal included angle formed between platform inclined faces 66, 68 is slightly greater, for example, two degrees greater than angle $\beta$. The difference in included angle is a function of the component tolerances imposed and anticipated range of motion, being selected based on the worst tolerance stack, so as to geometrically preclude simultaneous planar contact by both damper load faces 38, 40. The incrementally larger platform included angle works in combination with the offset center of gravity 58 to maintain substantially planar contact between abutting faces 38, 66 and substantially linear contact between faces 40, 68. Further, since the platform included angle is greater than $\beta$ and since $\beta$ has a value greater than about 90 degrees in a exemplary embodiment, the damper 22 will not readily wedge between platforms 28a, 28b. Yet further, since the center of gravity 58 is offset in the transverse direction toward primary face 38, rocking of the damper between inclined load faces 66, 68 is essentially eliminated as the following discussion will clarify.

In a first operational condition occurring when platform 28b moves radially outwardly or spreads circumferentially with respect to platform 28a, that is upwardly or to the left as depicted in FIG. 2, centrifugal force $F_c$ maintains primary load face 38 in planar contact with first platform face 66. As platform 28b moves, damper 22 slides along platform face 66 until linear contact with platform face 68 is restored.

Since the center of gravity 58 is offset, biasing the damper into planar contact with platform face 66, damper orientation is highly stable, there being no tendency for the damper 22 to rock into planar contact with platform face 68.

In another operational condition occurring when platform 28b moves radially inwardly or converges circumferentially, that is downwardly or to the right as depicted in FIG. 2, centrifugal force $F_c$ again maintains primary load face 38 in planar contact with first platform face 66. Due to the advantageous selection of vertex angle β to be near normal, restorative vector loading, $F_R$, acting on damper 22 through load face 40 is substantially parallel to first platform face 66, causing damper 22 to slide therealong. Damper 22 is therefore highly stable, unlike prior art configurations which exhibit metastable or bistable rocking.

In the event vertex angle β and included platform angle are varied from 90 degrees, restorative vector loading $F_R$ develops a component load vector which affects normal loading through the first platform face 66. For example, for β less than 90 degrees, restorative loading by platform 26b through inclined face 68 would have a component directed into platform face 66 compounding the load passing therethrough due to centrifugal load $F_c$. While increasing the normal load through faces 38, 66 increases damping, at some critical load related to the coefficient of friction μ therebetween, damper 22 effectively locks to platform 28a and damping is lost along that boundary. As included angle β becomes even more acute, the problem of wedging arises, wherein damper 22 locks simultaneously to both platforms 28a and 28b and essentially all damping is lost.

Alternatively, in the event vertex angle β and platform included angle are selected to have values somewhat greater than 90 degrees, restorative loading $F_R$ by platform 26b through inclined face 68 would have a component directed away from platform face 66 reducing the load passing therethrough due to centrifugal load $F_c$. Due to the dynamic nature of the geometric interaction as well as manufacturing tolerances associated with producing the damper load faces 38, 40 and platform inclined faces 66, 68, such a condition is generally advantageous, as it would ensure that increased loading across faces 38, 66 as described above would not routinely occur. As the vertex angle β becomes more obtuse, however, the normal load through faces 38, 66 is reduced to a greater degree as is the resultant damping. At sufficiently large included angles, for example greater than about 135 degrees, the restorative load of platform face 28b could cause damper instability and intermittent rocking of the damper 22 away from platform face 28a. Further, for greater included angles, the center of gravity 58 tends to migrate toward the radial line R passing through the vertex 42. Maintenance of offset x requires generally more angularity of base 44, which is limited, inter alia, by the geometric constraints of cavity 24.

In a preferred embodiment for a particular application in a low pressure turbine, damper 22 comprises a cast member of unitary construction of a cobalt based alloy, selected for beneficial wear characteristics when sliding against blade platforms 28 made of a single crystal, nickel based superalloy. Vertex included angle β has a nominal value of about 106 degrees. The included angle between platform faces 66, 68 has a nominal value of about 108 degrees, an included angle θ between radial line R and first face 66 having a nominal value of about 58 degrees and an included angle φ between radial line R and second face 68 having a nominal value of about 50 degrees. The base 44 forms an angle γ with radial line R and has a nominal value of about 83 degrees and the x offset from radial of the center of gravity 58 is about 0.024 inches. The damper 22 has a nominal weight of about 8.3 grams which corresponds to a combined centrifugal load acting on platform faces 66, 68 of about 700 pounds force at a rotor speed of 12,285 revolutions per minute. The greater the offset x, the greater the loading through primary face 38 with a concomitant reduction in loading through secondary face 40.

Employed in an as-cast condition, in a preferred embodiment, damper load faces 38, 40 have a planar contour tolerance of about ±0.003 inches and an average surface roughness of about 63 microinches rms, where contour tolerance defines an allowable contour variation from a true plane. Mating platform load faces 66, 68 are machined and have a planar contour tolerance of about ±0.001 inches and an average surface roughness of about 32 microinches rms. Casting gating on the damper may be located as desired on any noncontact area, such as base 44 or ends 48, 50. In a preferred embodiment, lubricants, rub coatings or other surface treatments are not utilized; however, use of such treatments may be desirable to achieve a particular coefficient of friction μ between mating surfaces or to protect the surfaces from oxidation or other environmental attack. Inappropriate or poorly applied treatments could wear nonuniformly, reduce effective damping or otherwise interfere with the advantageous sliding friction between respective abutting load faces.

Damper 22 is configured to be accepted in cavity 24 in solely one orientation, thereby precluding the possibility of misassembly. Damper legs 52, 54 are oriented against adjacent disk post 36 to position damper load faces 38, 40 proximate respective platform faces 66, 68 within about 0.020 inches. Additionally, tabs 56 are utilized to create an external contour of damper proximal and distal ends 48, 50 to match an internal contour of cavity 24, within a nominal gap of about 0.020 inches. Beyond preventing misassembly, ends 48, 50 with extending tabs 56 cooperate with blade retainers 18, 20 to discourage axial flow through cavity 24. In this manner, any hot primary flowpath gas ingested into disk forward cavity, shown generally at 70 in FIG. 1, is prevented from freely passing through cavity 24 and increasing the temperature of the blade shanks 30. A nominal clearance of about 0.005 inches is also provided between damper ends 48, 50 and retainers 18, 20 to ensure the damper 22 is free to move within cavity 24 and provide effective damping, not being subject to binding on proximate structure.

Instrumented engine testing of the preferred embodiment damper 22 has demonstrated noteworthy reduction of vibratory energy levels in turbine blades 14 for a variety of modes, including airfoil circumferential movement or flex, axial movement and torsional movement or twisting. First order flex is particularly well damped due to the relatively large amplitude of circumferential motion of the blade platform 28 in this mode, for example, on the order of about 0.005 inches or more. Beyond attenuating first order vibratory response, damper 22 also advantageously reduces higher order response, albeit to a lesser extent since relative motion at the blade platform 28 tends to be of lesser amplitude at higher orders. To facilitate optimizing damper configuration, damper weight and center of gravity offset are readily modifiable based on measured blade vibratory response and visual indicators of slippage such as burnished bands on load faces 38, 40, 66, 68.

While there have been described herein what are considered to be preferred embodiments of the present invention, other modifications of the invention will be apparent to those skilled in the art from the teaching herein. For example, depending on the requirements of a particular application, damper 22 may be suitably adapted to damp blading in fans, compressors or turbines having dovetails 32 skewed relative to the axis of rotation of the engine. Further, the blade abutting surfaces 66, 68 need not be part of the platform 28, but could be some other portion of the blade 14. The damper 22 need not have two legs 52, 54, but could have one centrally disposed leg or no leg at all. Yet further, the damper 22 need not incorporate tabs 56 to prevent axial flow through cavity 24. Additionally, damper body 46 need not have a triangular shaped cross-section, but could have any of a variety of other configurations, as long as a vertex 42 thereof were oriented in a proper manner. Yet further, a variety of suitable, wear resistant materials and manufacturing processes could be specified to produce damper 22, not being limited solely to an as-cast cobalt based alloy.

It is therefore desired to be secured in the appended claims all such modifications as fall within the true spirit and scope of the invention. Accordingly, what is desired to be secured by Letters Patent of the United States is the invention as defined and differentiated in the following claims.

I claim:

1. A blade-to-blade vibration damper for a gas turbine engine comprising:

a primary planar load face oriented to abut a portion of a first blade;

a secondary planar load face oriented to abut a portion of a second blade, said secondary face intersecting said primary face forming a vertex therewith, said vertex having an included angle having a value of at least about 90 degrees; and a distribution of mass in said damper such that a center of gravity thereof is offset from said vertex in a direction toward said primary face.

2. The invention according to claim 1 wherein said damper further comprises:

a base connected to both said primary and secondary faces; and a first leg extending from said base and oriented to abut a portion of a disk to position said damper primary and secondary faces proximate said respective first and second blade portions.

3. The invention according to claim 2 wherein:

said first leg is disposed at a proximal end of said damper; and a second leg is disposed at a distal end of said damper, said second leg extending from said base and oriented to abut a portion of said disk in cooperation with said first leg to position said damper primary and secondary faces proximate said respective first and second blade portions.

4. The invention according to claim 3 wherein said damper further comprises:

at least one tab extending from said primary or secondary face and oriented for disposition in close proximity to adjacent structure of said first or second blade to discourage passage of flow thereby.

5. The invention according to claim 3 wherein said damper further comprises:

first and second tabs extending from each of said primary and secondary faces, said first and second tabs disposed respectively at said proximal and distal ends of said damper and oriented for disposition in close proximity to adjacent structure of said first and second blades to discourage passage of flow thereby.

6. The invention according to claim 1 wherein:

said vertex included angle has a value of between about 90 degrees and about 120 degrees.

7. The invention according to claim 1 wherein:

said damper comprises a cast member of unitary construction.

8. The invention according to claim 7 wherein:

said primary and secondary load faces comprise as-cast surfaces.

9. The invention according to claim 1 wherein:

said damper is comprised of a cobalt based alloy.

10. A stage of a rotor of a gas turbine engine comprising:

a rotatable disk having a plurality of contoured slots in a rim portion thereof defined by a common number of contoured disk posts;

a common number of blades having complementarily shaped dovetails disposed in said contoured slots, said blades having platform portions extending therefrom in circumferential and axial directions forming a substantially contiguous flowpath surface disposed radially outwardly from said disk rim; and at least one blade-to-blade vibration damper disposed in a cavity bounded at least in pan by a disk post and respective platforms of first and second adjacent blades, said damper comprising:

a primary planar load face oriented to abut said platform of said first blade;

a secondary planar load face oriented to abut said platform of said second blade, said secondary face intersecting said primary face forming a vertex therewith, said vertex having an included angle having a value of at least about 90 degrees; and a distribution of mass in said damper such that a center of gravity thereof is offset from said vertex in a direction toward said primary face.

11. The invention according to claim 10 wherein:

said damper vertex is substantially aligned with a gap formed by adjacent edges of said first and second blade platforms;

said first blade platform comprises a radially inwardly disposed planar face oriented to abut said primary load face of said damper; and said second blade platform comprises a radially inwardly disposed planar face oriented to abut said secondary load face of said damper, wherein said first and second planar faces form an included angle having a value of at least about 90 degrees.

12. The invention according to claim 11 wherein:

said platform included angle has a value greater than a value of said vertex included angle.

13. The invention according to claim 12 wherein upon rotation of said rotatable disk above a predetermined rotational speed, contact between said damper and said first and second blade platforms comprises:

substantially planar contact between said primary load face and said first platform planar face; and substantially linear contact between said secondary load face and said second platform planar face.

14. The invention according to claim 13 wherein:

said damper seals said platform edge gap preventing flow communication between said flowpath and said cavity in which said damper is disposed.

15. The invention according to claim 10 wherein:

said vertex included angle has a value of between about 90 degrees and about 120 degrees.

16. The invention according to claim 10 wherein said damper further comprises:

a base connected to both said primary and secondary load faces; and at least one leg extending from said base and oriented to abut said disk post bounding said damper cavity, to position said damper primary and secondary load faces proximate said respective first and second blade platforms.

17. The invention according to claim 10 wherein said rotor stage further comprises:

first and second blade retainers disposed on respective first and second faces of said disk, bounding in part said cavity in which said damper is disposed, preventing axial migration of said damper out of said cavity.

18. The invention according to claim 17 wherein said damper further comprises:

at least one tab extending from at least one of said primary and secondary faces, said at least one tab disposed in close proximity to adjacent structure to discourage passage of flow through said cavity.

* * * * *